US012809937B2

(12) United States Patent
Ross et al.

(10) Patent No.: US 12,809,937 B2
(45) Date of Patent: Nov. 24, 2026

(54) LOW-DIMENSIONAL PROBABILISTIC DENSITY OF HIGH-DIMENSIONAL DATA MANIFOLD

(71) Applicant: THE TORONTO-DOMINION BANK, Toronto (CA)

(72) Inventors: Brendan Leigh Ross, Toronto (CA); Jesse Cole Cresswell, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1111 days.

(21) Appl. No.: 17/735,884

(22) Filed: May 3, 2022

(65) Prior Publication Data

US 2023/0004694 A1 Jan. 5, 2023

Related U.S. Application Data

(60) Provisional application No. 63/210,957, filed on Jun. 15, 2021.

(51) Int. Cl.

| | |
|---|---|
| ***G06F 18/2137*** | (2023.01) |
| ***G06F 17/11*** | (2006.01) |
| ***G06F 17/18*** | (2006.01) |
| *G06N 20/00* | (2019.01) |

(52) U.S. Cl.
CPC ........ *G06F 18/21375* (2023.01); *G06F 17/11* (2013.01); *G06F 17/18* (2013.01); *G06N 20/00* (2019.01)

(58) Field of Classification Search
CPC ..... G06F 18/21375; G06F 17/11; G06F 17/18
See application file for complete search history.

(56) References Cited

PUBLICATIONS

John M. Lee, "Introduction to Riemannian Manifolds", Springer, 2018, pp. 1-437 [retrieved from https://link.springer.com/content/pdf/10.1007/978-3-319-91755-9.pdf]. (Year: 2018).*

Morio Obata, "Conformal Transformations of Riemannian Manifolds", Journal of Differential Geometry, 1970, pp. 311-333 [retrieved from https://projecteuclid.org/journalArticle/Download?urlid=10.4310%2Fjdg%2F1214429505]. (Year: 1970).*

F.H. King, "11—Transforming Density Functions", pp. 1-11 [retrieved from https://www.cl.cam.ac.uk/teaching/0708/Probabilty/]. (Year: 2008).*

(Continued)

*Primary Examiner* — Brian W Wathen

(74) *Attorney, Agent, or Firm* — Hopewell IP, P.C.

(57) ABSTRACT

A computer models a high-dimensional data with a low-dimensional manifold in conjunction with a low-dimensional base probability density. A first transform (a manifold transform) may be used to transform the high-dimensional data to a low-dimensional manifold, and a second transform (a density transform) may be used to transform the low-dimensional manifold to a low-dimensional probability distribution. To enable the model to tractably learn the manifold transformation from the high-dimensional to low-dimensional spaces, the manifold transformation includes conformal flows, which simplify the probabilistic volume transform and enables tractable learning of the transform. This may also allow the manifold transform to be jointly learned with density transform.

20 Claims, 6 Drawing Sheets

(56) References Cited

PUBLICATIONS

Rezende et al., "Normalizing Flows on Tori and Spheres" Proceedings of the 37th International Conference on Machine Learning, vol. 113, Jul. 2020, pp. 1-16 [retrieved from https://proceedings.mlr.press/v119/]. (Year: 2020).*
Bansal, et al., "Can We Gain More from Orthogonality Regularizations in Training Deep CNNs?," Advances in Neural Information Processing Systems, 2018, 11 pages; https://proceedings.neurips.cc/paper/2018/file/bf424cb7b0dea050a42b9739eb261a3a-Paper.pdf.
Behrmann, et al., "Understanding and Mitigating Exploding Inverses in Invertible Neural Networks," Proceedings of the 24th International Conference on Artificial Intelligence and Statistics (AISTATS) 2021, San Diego, California, USA. PMLR: vol. 130, Copyright 2021, 11 pages; http://proceedings.mlr.press/v130/behrmann21a/behrmann21a.pdf.
Brehmer, et al., "Flows for simultaneous manifold learning and density estimation," Advances in Neural Information Processing Systems, vol. 33, 2020, 12 pages; https://proceedings.neurips.cc/paper/2020/file/051928341be67dcba03f0e04104d9047-Paper.pdf.
Brock, et al., "Large Scale GAN Training for High Fidelity Natural Image Synthesis," arXiv:1809.11096v2 [cs.LG], Feb. 25, 2019, 35 pages; https://arxiv.org/pdf/1809.11096.pdf%20http://arxiv.org/abs/1809.11096.pdf.
Caterini, et al., "Rectangular Flows for Manifold Learning," 35th Conference on Neural Information Processing Systems, Dec. 6, 2021, 14 pages; https://proceedings.neurips.cc/paper/2021/file/fde9264cf376fffe2ee4ddf4a988880d-Paper.pdf.
Child, R., "Very Deep VAEs Generalize Autoregressive Models and Can Outperform Them on Images," arXiv:2011.10650v2 [cs.LG], Mar. 16, 2021, 17 pages; https://arxiv.org/pdf/2011.10650.pdf.
Cunningham, et al., "Normalizing Flows Across Dimensions," arXiv:2006.13070v1 [stat.ML], Jun. 23, 2020, 20 pages; https://arxiv.org/pdf/2006.13070.pdf.
Cunningham, et al., "RealMVP: A Change of Variables Method For Rectangular Matrix-Vector Products," Proceedings of The 24th International Conference on Artificial Intelligence and Statistics (AISTATS), vol. 130, Copyright 2021, 10 pages; http://proceedings.mlr.press/v130/cunningham21a/cunningham21a.pdf.
Dai, et al., "Diagnosing and Enhancing VAE Models," arXiv:1903.05789v2 [cs.LG], Oct. 30, 2019, 44 pages; https://arxiv.org/pdf/1903.05789.pdf.
Difrancesco, et al., "Conformal Field Theory," Springer Science & Business Media, Dec. 6, 2012, 15 pages; https://www.physique.usherbrooke.ca/pages/sites/default/files/senechal/errata.pdf.
Dinh, et al., "Density Estimation Using Real NVP," arXiv:1605.08803v3 [cs.LG], Feb. 27, 2017, 32 pages; https://arxiv.org/pdf/1605.08803.pdf.
Dinh, et al., "NICE: Non-Linear Independent Components Estimation," arXiv:1410.8516v6 [cs.LG], Apr. 10, 2015, 13 pages; https://arxiv.org/pdf/1410.8516.pdf.
Du, et al., "Implicit Generation and Modeling with Energy-Based Models," Advances in Neural Information Processing Systems, vol. 32, 2019, 11 pages; https://proceedings.neurips.cc/paper/2019/file/378a063b8fdb1db941e34f4bde584c7d-Paper.pdf.
Fefferman, et al., "Testing The Manifold Hypothesis," Journal of the American Mathematical Society, vol. 29, No. 4, Oct. 2016, 67 pages; https://www.ams.org/journals/jams/2016-29-04/S0894-0347-2016-00852-4/S0894-0347-2016-00852-4.pdf.
Gemici, et al., "Normalizing Flows on Riemannian Manifolds," arXiv:1611.02304v2 [stat.ML], Nov. 9, 2016, 3 pages; https://arxiv.org/pdf/1611.02304.pdf.
Goodfellow, et al., "Generative Adversarial Nets," arXiv:1406.2661v1 [stat.ML], Jun. 10, 2014, 9 pages; https://arxiv.org/pdf/1406.2661.pdf.
Harandi, et al., "Generalized BackPropagation Étude De Cas: Orthogonality," arXiv:1611.05927v1 [cs.CV], Nov. 17, 2016, 19 pages; https://arxiv.org/pdf/1611.05927.pdf.
Heusel, et al., "GANs Trained By a Two Time-Scale Update Rule Converge to a Local Nash Equilibrium," Advances in Neural Information Processing Systems, vol. 30, 2017, 12 pages; https://proceedings.neurips.cc/paper/2017/file/8a1d694707eb0fefe65871369074926d-Paper.pdf.
Ho, et al., "Denoising Diffusion Probabilistic Models," Advances in Neural Information Processing Systems, vol. 33, 2020, 12 pages; https://proceedings.neurips.cc/paper/2020/file/4c5bcfec8584af0d967f1ab10179ca4b-Paper.pdf.
Huang, et al., "Orthogonal Weight Normalization: Solution to Optimization Over Multiple Dependent Stiefel Manifolds in Deep Neural Networks," arXiv:1709.06079v2 [cs.LG], Nov. 21, 2017, 20 pages; https://www.researchgate.net/profile/Lei-Huang-67/publication/319928652_Orthogonal_Weight_Normalization_Solution_toOptimization_over_Multiple_Dependent_Stiefel_Manifolds_in_Deep_NeuralNetworks.
Ia, et al., "Improving training of deep neural networks via Singular Value Bounding," Proceedings of the IEEE Conference on Computer Vision and Pattern Recognition, 2017, 9 pages; https://openaccess.thecvf.com/content_cvpr_2017/papers/Jia_Improving_Training_of_CVPR_2017_paper.pdf.
Karras, et al., "A Style-Based Generator Architecture for Generative Adversarial Networks," Proceedings of the IEEE/CVF conference on computer vision and pattern recognition, 2019, 10 pages; https://openaccess.thecvf.com/ content_CVPR_2019/papers/Karras_A_Style-Based_Generator_Architecture_for_Generative_Adversarial_Networks_CVPR_2019_paper.pdf.
Kingma, et al., "ADAM: A Method for Stochastic Optimization," arXiv:1412.6980v9 [cs.LG], Jan. 30, 2017, 15 pages; https://arxiv.org/pdf/1412.6980.pdf.
Kingma, et al., "Auto-Encoding Variational Bayes," arXiv:1312.6114v10 [stat.ML], May 1, 2014, 14 pages; https://arxiv.org/pdf/1312.6114.pdf?source=post_page.
Kingma, et al., "Glow: Generative Flow with Invertible 1x1 Convolutions," Advances in neural information processing systems, vol. 31, 2018, 10 pages; https://proceedings.neurips.cc/paper/2018/file/d139db6a236200b21cc7f752979132d0-Paper.pdf.
Kingma, et al., "Improved Variational Inference with Inverse Autoregressive Flow," Advances in neural information processing systems, vol. 29, 2016, 9 pages; https://proceedings.neurips.cc/paper/2016/file/ddeebdeefdb7e7e7a697e1c3e3d8ef54-Paper.pdf.
Kothari, et al., "Trumpets: Injective Flows for Inference and Inverse Problems," arXiv:2102.10461v1 [cs.LG], Feb. 20, 2021, 16 pages; https://arxiv.org/pdf/2102.10461.pdf.
Kumar, et al., "Regularized Autoencoders via Relaxed Injective Probability Flow," Proceedings of the 23rd International Conference on Artificial Intelligence and Statistics (AISTATS), vol. 108, Jun. 3, 2020, 9 pages; http://proceedings.mlr.press/v108/kumar20a/kumar20a.pdf.
Lee, J. M., "Introduction to Riemannian Manifolds," Second Edition, Springer International Publishing, 2018, 11 pages; https://sites.math.washington.edu/~lee/Books/RM/front-matter.pdf.
Lezcano-Casado, et al., "Cheap Orthogonal Constraints in Neural Networks: A Simple Parametrization of the Orthogonal and Unitary Group," Proceedings of the 36th International Conference on Machine Learning , vol. 97, 2019, May 24, 2019, 10 pages; http://proceedings.mlr.press/v97/lezcano-casado19a/lezcano-casado19a.pdf.
Lezcano-Casado, M., "Trivializations for Gradient-Based Optimization on Manifolds," Advances in Neural Information Processing Systems, vol. 32, 2019, 12 pages; https://proceedings.neurips.cc/paper/2019/file/1b33d16fc562464579b7199ca3114982-Paper.pdf.
Liu, et al., "Deep Learning Face Attributes in the Wild," Proceedings of the IEEE international conference on computer vision, Dec. 2015, 9 pages; https://openaccess.thecvf.com/content_iccv_2015/papers/Liu_Deep_LearningFace_ICCV_2015_paper.pdf.
Mathieu, et al., Riemannian Continuous Normalizing Flows, Advances in Neural Information Processing Systems, vol. 33, 2020, 13 pages; https://proceedings.neurips.cc/paper/2020/file/1aa3d9c6ce672447e1e5d0f1b5207e85-Paper.pdf.
Nair, et al., "Rectified Linear Units Improve Restricted Boltzmann Machines," Proceedings of the 27th International Conference on International Conference on Machine Learning, 2010, 8 pages; https://icml.cc/Conferences/2010/papers/432.pdf.

(56) References Cited

PUBLICATIONS

Ozay, et al. "Optimization on Submanifolds of Convolution Kernels in CNNs," arXiv: 1610.07008v1 [cs.CV], Oct. 22, 2016, 9 pages; https://arxiv.org/pdf/1610.07008.pdf.
Papamakarios, et al., "Normalizing Flows for Probabilistic Modeling and Inference," Journal of Machine Learning Research 22, No. 57, Jan. 1, 2021, 64 pages; https://www.jmlr.org/papers/volume22/19-1028/19-1028.pdf.
Peterfreund, et al., "Local conformal autoencoder for standardized data coordinates," Proceedings of the National Academy of Sciences, vol. 117, No. 49, Dec. 8, 2020, 10 pages; https://www.pnas.org/doi/pdf/10.1073/pnas.2014627117.
Qi, et al., "Deep Isometric Learning for Visual Recognition," Proceedings of the 37th International Conference on Machine Learning, vol. 119, Nov. 21, 2020, 12 pages; http://proceedings.mlr.press/v119/qi20a/qi20a.pdf.
Radford, et al., "Unsupervised Representation Learning with Deep Convolutional Generative Adversarial Networks," arXiv:1511.06434v2 [cs.LG], Jan. 7, 2016, 16 pages; https://arxiv.org/pdf/1511.06434.pdf%C3.
Rezende, et al., "Normalizing Flows on Tori and Spheres," Proceedings of the 37th International Conference on Machine Learning, vol. 119, Nov. 21, 2020, 10 pages; http://proceedings.mlr.press/v119/rezende20a/rezende20a.pdf.
Rezende, et al., "Variational Inference with Normalizing Flows," Proceedings of the 32nd International Conference on Machine Learning , vol. 37, Jun. 1, 2015, 9 pages; http://proceedings.mlr.press/v37/rezende15.pdf.
Tomczak, et al., "Improving Variational Auto-Encoders using Householder Flow," arXiv:1611.09630v4 [cs.LG], Jan. 27, 2017, 8 pages; https://arxiv.org/pdf/1611.09630.pdf.
Vahdat, et al., "NVAE: A Deep Hierarchical Variational Autoencoder," 34th Conference on Neural Information Processing Systems, vol. 33, 2020, 13 pages; https://proceedings.neurips.cc/paper/2020/file/e3b21256183cf7c2c7a66be163579d37-Paper.pdf.
Van Den Oord, et al., "Pixel Recurrent Neural Networks," Proceedings of The 33rd International Conference on Machine Learning, vol. 48, Jun. 11, 2016, 10 pages; http://proceedings.mlr.press/v48/oord16.pdf.
Xiao, et al., "Dynamical Isometry and a Mean Field Theory of CNNs: How to Train 10,000-Layer Vanilla Convolutional Neural Networks," Proceedings of the 35th International Conference on Machine Learning, vol. 80, Jul. 3, 2018, 10 pages; http://proceedings.mlr.press/v80/xiao18a/xiao18a.pdf.
Canadian IP Office, International Search Report and Written Opinion mailed on Jul. 11, 2022 in PCT/CA2022/050698, 8 pages.
Gropp et al., "Isometric Autoencoders," ArXiv, Oct. 3, 2020, pp. 1-16, retrieved on Jul. 5, 2022 from the Internet https://arxiv.org/pdf/2006.09289.pdf.
Lei et al, "A Geometric Understanding of Deep Learning," Engineering vol. 6(3), pp. 361-374, Jan. 11, 2020, retrieved on Jul. 5, 2022 from the Internet https://www.sciencedirect.com/science/article/pii/S2095809919302279.
Ross et al., "Tractable Density Estimation on Learned Manifolds with Conformal Embedding Flows," 35th Conference on Neural Information Processing Systems (NeuriPS 2021), Dec. 6-14, 2021, pp. 1-14, retrieved on Jul. 5, 2022 from the Internet https://proceedings.neurips.cc/paper/2021/file/dfd786998e082758be12670d856df755-Paper.pdf.

* cited by examiner

LOW-DIMENSIONAL PROBABILISTIC DENSITY OF HIGH-DIMENSIONAL DATA MANIFOLD

CROSS-REFERENCE TO RELATED APPLICATION

This application claims the benefit of provisional U.S. application No. 63/210,957, filed Jun. 15, 2021, the contents of which are incorporated herein by reference in their entirety.

BACKGROUND

This disclosure relates generally to computer modeling of high-dimension data spaces, and more particularly to probabilistic modeling of the high-dimensional data in a low-dimensional space.

As machine learning techniques and infrastructures become more sophisticated and increase performance on data sets, machine models are increasingly tasked with processing high-dimensional data sets and to generate new instances (also termed data points). Existing solutions struggle with effectively representing the complete range of high-dimensional data set or in doing so in a low-dimensional space (e.g., representing a manifold of the relatively higher-dimensional data in a lower-dimensional space) while simultaneously permitting effective probabilistic modeling of the data and with an approach that is actually computable (i.e., tractable). For example, while generative adversarial network (GAN) models have been used to learn to generate data in conjunction with feedback from a discriminative model, the generative model can neglect to learn how to generate certain types of content from the training data and do not model underlying probabilities. In other examples, some models like variational autoencoders (VAE) may be used to model high-dimensional data points in low-dimensional spaces without consideration of probabilistic distribution.

Alternative solutions, such as normalizing flows, that do provide probabilistic information maintain the same data dimensionality and do not effectively learn complex high-dimensional spaces in which the high-dimensional data is better characterized as a manifold describable with a low-dimensional representation.

As such, there is a need for an approach to tractably model data points of a high-dimensional space while accounting for a manifold of the data within the high-dimensional space while also providing effective density/probabilistic modeling.

SUMMARY

A computer model provides an approach for describing high-dimensional data in a high-dimensional space as a manifold described by a low-dimensional space and also modeled by a probability distribution. To model the data effectively and tractably, a first transform (also termed a manifold transform) between the high-dimensional space and the low-dimensional space includes one or more conformal flows. Various conformal flows provide operations for transforming data points in the high-dimensional space to the low-dimensional space. The low-dimensional space describing the manifold of the high-dimensional space is termed a low-dimensional manifold space to designate the coordinate system in which the high-dimensional manifold is represented. The manifold transformation (as applied to data points in the high-dimensional space) describes a manifold of the high-dimensional space in the low-dimensional space as a corresponding low-dimensional manifold. To provide density estimation, a second transformation (a density transformation) transforms between the low-dimensional manifold space and a low-dimensional density space, in which a base probability distribution (e.g., a gaussian) is readily determined.

The parameters of the first transformation (the manifold transformation) and the second transformation (the density transform) are learned based on training data in the high-dimensional space. After training, the model may be used to transform to and from the high-dimensional space and the base probability distribution in the low-dimensional density space. For example, a data point from the high-dimensional space may be transformed to the density space for comparison with the base distribution (e.g., to evaluate a new sample with respect to the learned probability distribution as in- or out-of-distribution) or an output of the model may be sampled by sampling a point from the base probability distribution and transforming the sampled point to the high-dimensional space as an output.

By transforming between the high and low-dimensional spaces to represent the manifold of the high-dimensional space, the actual regions of data distribution in the high-dimensional space may be effectively modeled, while the transformation to the density space permits the data to also be modeled with respect to the base probability distribution. In addition, the use of conformal flows enables the transformation between high- and low-dimensional spaces to be tractable, invertible, and include multiple layers (e.g., multiple conformal operations may be sequentially applied and maintain these properties).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
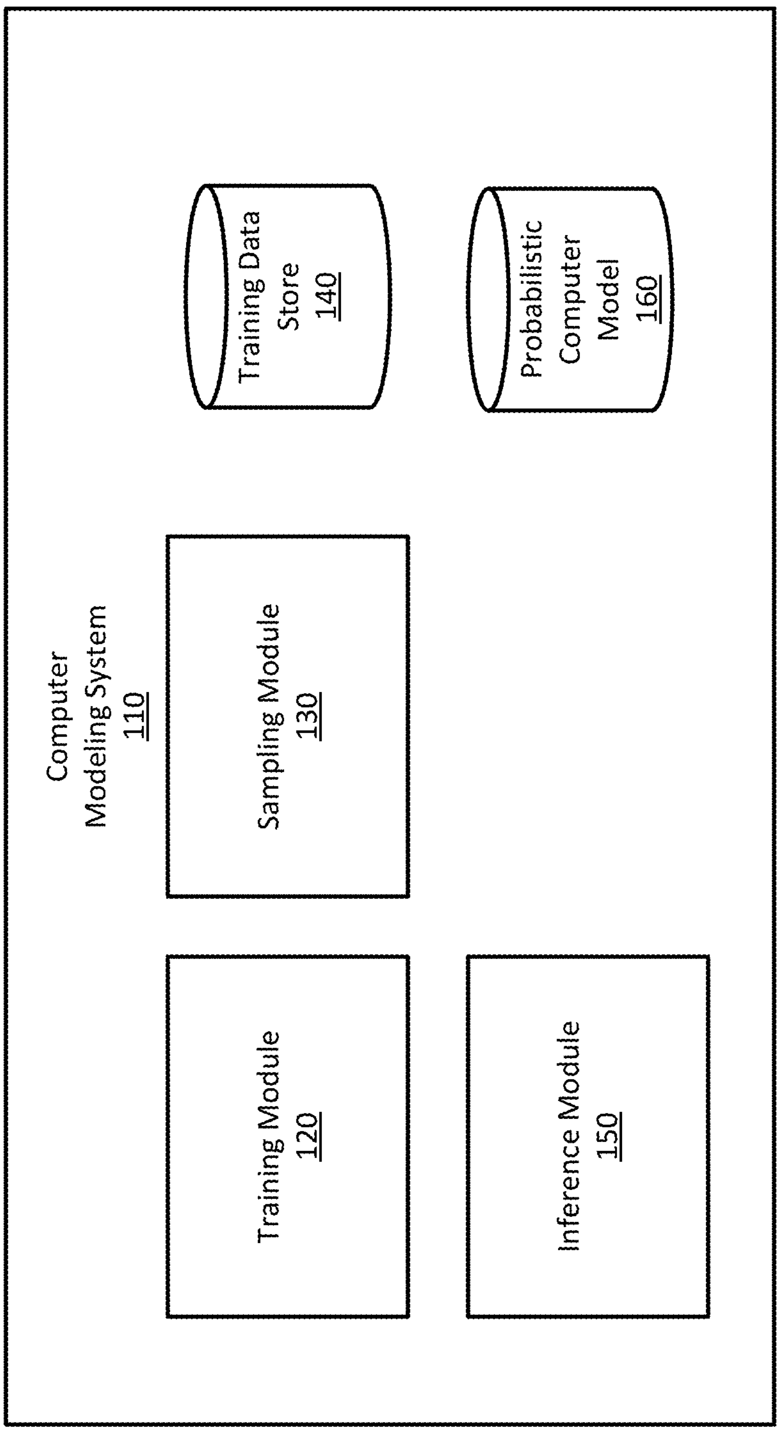
FIG. 1 illustrates a computer modeling system including components for probabilistic modeling of a high-dimensional space.

FIG. 1 illustrates a computer modeling system 110 including components for probabilistic modeling of a high-dimensional space. The computer modeling system 110 includes computing modules and data stores for generating and using a computer model 160. In particular, the computer model 160 is configured to represent high-dimensional data with a low-dimensional manifold and as a probability density. The probabilistic computer model 160 is trained by the training module 120 to learn parameters for a model learned probability density describing the training data of training data store 140. Individual training data items are referred to as data points or data instances and may be represented in a "high-dimensional" space. The computer model 160 represents points in the high-dimensional space as a manifold in a low-dimensional space along with a probability density for the data. This enables the model to simultaneously address the appearance of the training data within a sub-region of the high-dimensional space while also enabling effective probabilistic applications for the model. To tractably convert the data from the high-dimensional space to a low-dimensional space, the model uses one or more conformal flows, which enables the transformation between high- and low-dimensional spaces to be effectively learned and allows the learning of a transformation in the low-dimensional space to a base probability density to learn the probability density with respect to the low-dimensional space. In various embodiments, these transformations are jointly learned such that the probability density and the manifold directly reflect the high-dimensional training data distribution.

After training, the sampling module 130 may sample outputs from the probabilistic computer model 160 by sampling a value from a base probability density in a low-dimensional space and transforming the sampled value to an output in the high-dimensional space, enabling the model to generatively create outputs similar in structure and distribution to the data points of the training data 140. Similarly, an inference module 150 may receive a new data point in the high-dimensional space and convert it a point with respect to the base probability density for determination of the expected frequency of the data point given the learned probability density. This may be used to determine, for example, whether the new data point may be considered "in-distribution" or "out-of-distribution" with respect to the trained probability density. Further details of each of these aspects is discussed further below.

Figure 2:
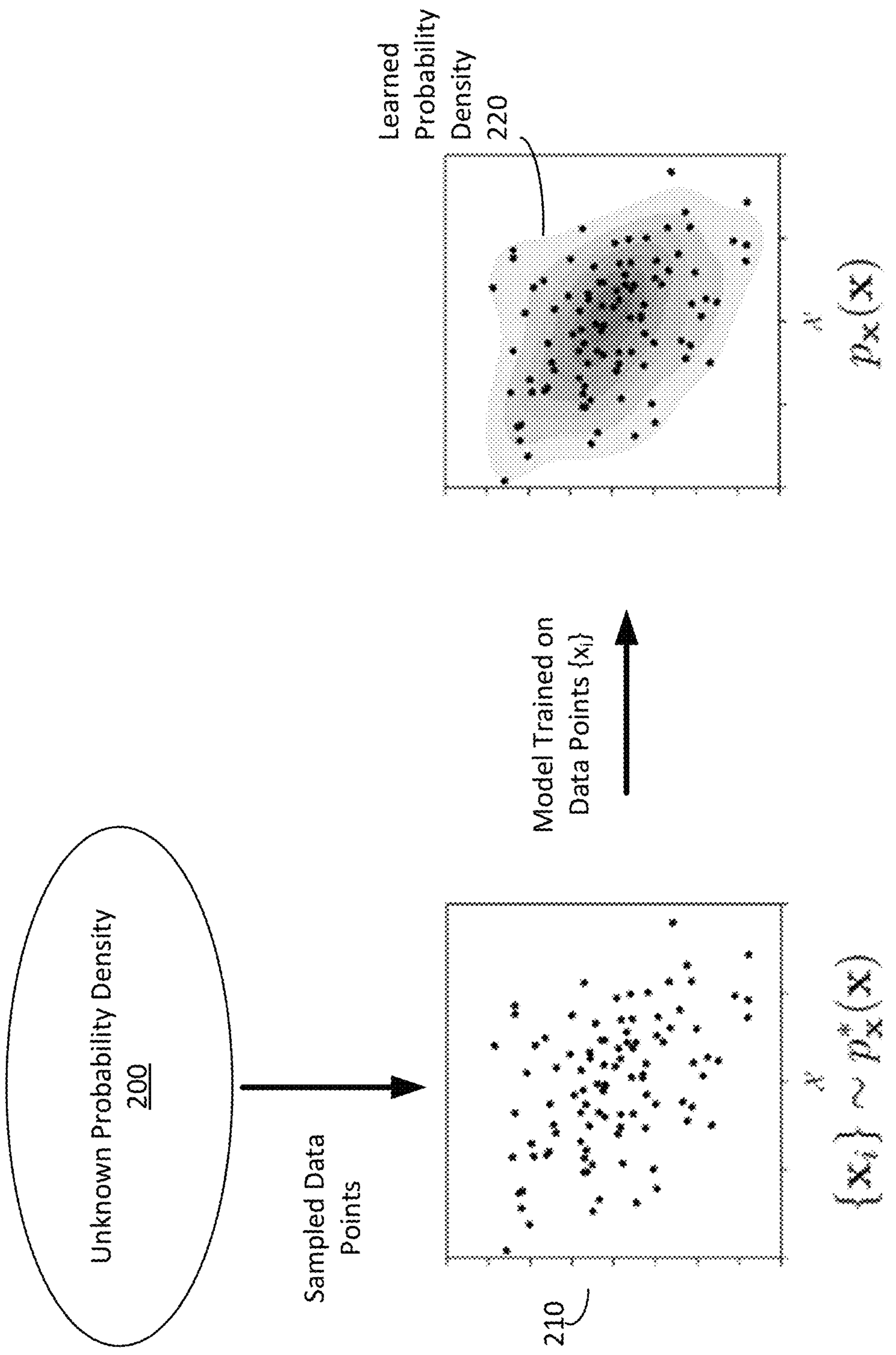
FIG. 2 shows an example of data points and a learned probability density.

FIG. 2 shows an example of data points and a learned probability density 220. In general, data points for which the model is trained are considered to be sampled from an unknown probability density 200. Each of the data points 210 has a set of values in the dimensions of a high-dimensional space, and thus can be considered to represent a position in the high-dimensional space. Formally, the data points 210 may also be represented as a set of points, $\{x_i\}$ drawn from the unknown probability density $$p_x^*(x).$$

The model is trained to learn a probability density $p_x(x)$ as represented by trained/learned parameters of the computer model based on the data points $\{x_i\}$. In many cases, however, high-dimensional data lies on a manifold of the high-dimensional space that may be more effectively modeled when described in a low-dimensional space, such that directly learning a probability density on the high-dimensional data may prove both ineffective and require many parameters to describe in particularly high-dimensional data sets. In general, the high-dimensional space has a number of dimensions referred to as n, and the low-dimensional space has a number of dimensions referred to as m. While the concepts discussed herein may apply to situations in which the high-dimensional space is relatively higher than the low-dimensional space (e.g., $m<n$), and may thus apply to dimensions of $n=3$ and $m=2$, in many cases the high-dimensional space may have tens or hundreds of thousands, or millions of dimensions, and the low-dimensional space may have fewer dimensions by an order of magnitude or more.

Figure 3:
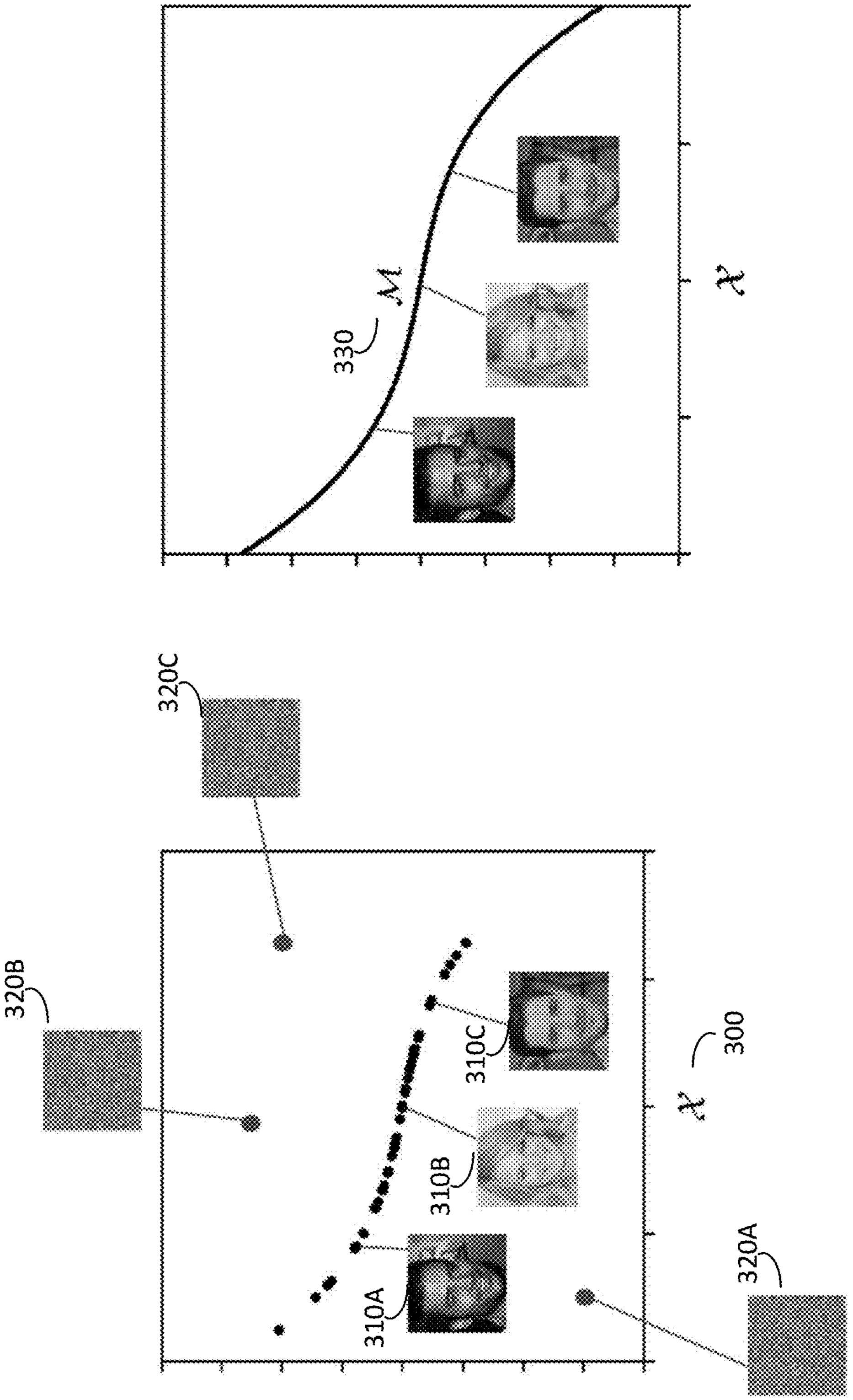
FIG. 3 illustrates a high-dimensional space in which data points lie along a manifold.

FIG. 3 illustrates a high-dimensional space in which data points lie along a manifold. In this example, the high-dimensional space 300 represents image data in two dimensions. Each point of high-dimensional image data represents an image having dimensions that may have a value for each channel (e.g., 3 channels for RGB color) for each pixel across a length and width of the image. Hence, the total dimensional space for an image data point in the high-dimensional space 300 for this example is the image length times the width times the number of channels times the bit length representing the color value: L×W×C×B. Stated another way, each color channel for each pixel across the image can have any value according to the bit length. In practice, however, only some portions of the complete dimensional space may be of interest and are represented in the training set. While the range of the complete high-dimensional image space can be used for any possible image, individual data sets typically describe a range across a subset of the high-dimensional space 300. In this example, a data set of human faces include data points 310A-C. However, many points in the image data space do not represent human faces and may have no visually meaningful information at all, such as data points 320A-C, depicting points in the high-dimensional space that have no relation to the type of data of the human face data set. As such, while the high-dimensional data space 300 may permit a large number of possible positions of data points, in practice data sets (e.g., human faces) represent some portion of the high-dimensional space that may be characterized in fewer parameters (i.e., in lower dimensions). The region of the high-dimensional space may be described as a manifold 330 of the high-dimensional space. As discussed below, the shape of the manifold 330 in the high-dimensional space may be learned and represented in a low-dimensional space to characterize the actual positions of data points in the high-dimensional space 300. The manifold 330 is thus learned to generally describe the "shape" of the data points within the high-dimensional space and may thus be considered to describe constraints on the areas in which data points exist and interactions between them. For example, a data set of human faces may generally exist in a region of possible images in which there is a nose, eyes, mouth, and the image is mostly symmetrical.

Figure 4:
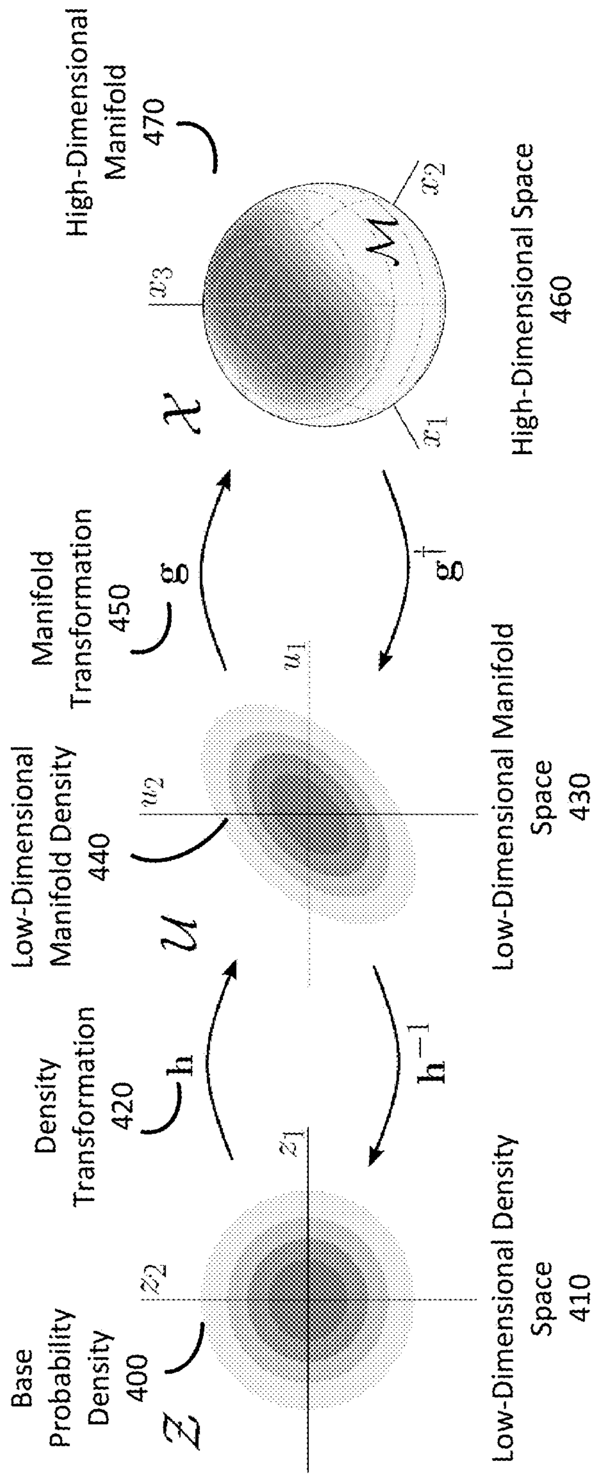
FIG. 4 shows an example structure for a probabilistic computer model for modeling high-dimensional data with a manifold and probability density in low-dimensional space, according to one embodiment.

FIG. 4 shows an example structure for a probabilistic computer model for modeling high-dimensional data with a manifold and a probability density in low-dimensional space, according to one embodiment. As a general overview, the computer model performs a probability estimation with respect to a base probability density 400 in a low-dimensional density space 410 and models a probability density for a high-dimensional manifold 470 with a low-dimensional manifold density 440 in a low-dimensional manifold space 430. The low-dimensional manifold space 430 is a space that may model a manifold of the high-dimensional data in a low-dimensional space based on the manifold transformation 450. In addition, the low-dimensional manifold space 430, in conjunction with a density transformation 420 from the base probability density 400, provides a low-dimensional manifold density 440 describing density information in the low-dimensional manifold space 430.

Probability density information may be determined for the low-dimensional manifold density 440 by applying a density transformation 420 to the base probability density 400. Similarly, the low-dimensional manifold density 440 may be changed to the high-dimensional space 460 by applying the manifold transformation 450 to the low-dimensional manifold density 440.

The individual "spaces" may be considered to represent different coordinate systems for which the manifold transformation 450 and density transformation 420 provide change-of-variable equations for changing coordinates with respect to one space to coordinates with respect to another space. In this sense, the low-dimensional manifold space 430 provides a bridge between 1) the low-dimensional manifold learned for the high-dimensional data and 2) the probabilistic density of the base probability density 400. The transformations may also be referred to as "flows" between the different data representations in the different spaces. Considered this way, the base probability density 400 flows through the density transformation 420 and then the manifold transformation 450 to provide a probability density in the high-dimensional space within the region of the learned high-dimensional manifold 470. As such, while the low-dimensional density space 410 may have the same number of dimensions as the low-dimensional manifold space 430, it represents a distinct coordinate system such that a position in one space must be translated to the other via the appropriate density transformation 420 (e.g., h or $h^{-1}$). As discussed more fully below, the training data in high-dimensional space 460 and the known base probability density 400 is used to learn the respective transformations and corresponding density distributions, permitting the model to effectively model high-dimensional data probabilistically with a low-dimensional manifold.

In some embodiments, the density transformation 420 and manifold transformation 450 generally apply one or more layers of operations in sequence, and in practice may be applied together without explicit designation of a low-dimensional manifold space 430. As such, the low-dimensional manifold space 430 and the respective low-dimensional manifold density 440 may reflect an intermediate state within a general sequence of transformations between the base probability density 400 in a low-dimensional space relative to a high-dimensional space of a data set/output. The manifold transformation 450 may thus refer to a transformation (one or more functions/layers) that changes the dimensionality of the high-dimensional space to describe an embedding in a low-dimensional space, while the density transformation 420 may refer to a transformation (one or more functions/layers) that retains dimensionality between a known probability density (e.g., the base probability density 400) and the manifold transformation 450.

In this example model structure, the computer model represents data with respect to a high-dimensional space 460, describing the high-dimensional space in which training data exists and for which sampled outputs from the model may be generated. The high-dimensional space may also be formally referred to as $\mathcal{X}$. The model learns a manifold transformation 450 between a high-dimensional manifold 470 and a low-dimensional manifold density 440 in a low-dimensional manifold space 430. The low-dimensional manifold space 430 (and its respective coordinate system) may be referred to as $\mathcal{U}$. The low-dimensional manifold density 440 describes the location of the high-dimensional manifold 470 with respect to the reduced dimensionality of the low-dimensional manifold space 430.

The manifold transformation 450 is includes functions g and inverse $g^{\dagger}$ for transforming between the high-dimensional space 460 and the low-dimensional manifold space 430. The function $g^{\dagger}$ transforms points in the high-dimensional space 460 to the low-dimensional manifold space 430: $g^{\dagger}: \mathcal{X} \rightarrow \mathcal{U}$. The inverse function g transforms points in the low-dimensional space 430 to the high-dimensional space 460: g: $\mathcal{U} \rightarrow \mathcal{X}$. The range of outputs of the manifold transformation g (a subset of the high-dimensional space 460) is the high-dimensional manifold 470. Stated another way, the high-dimensional manifold 470 (as learned by the transformation) is defined by the manifold transformation g applied to coordinates in the low-dimensional manifold space 430: $\mathcal{M}=g(\mathcal{U})$. As discussed further below, the manifold transformation 450 includes one or more conformal flows, which permit the manifold transformation to be tractable and learnable by automated training processes, along with permitting it to optionally be combined with the density transformation 420 in the training.

Similarly, the low-dimensional density space 410 is also referred to as Z, with a density transformation 420 having functions h and its inverse $h^{-1}$ for transforming between the low-dimensional density space 410 and the low-dimensional manifold space 430, with corresponding equations $\mathcal{U}=h(Z)$ and $Z=h^{-1}(\mathcal{U})$ respectively. In particular, the low-dimensional density space 410 is the coordinate system in which the base probability density 400 may be sampled. The base probability density 400 is a known probability density, such as a Standard multivariate probability density (e.g., a Gaussian). The base probability density 400 is generally continuous, such that the probability density at a particular point may be described by a derivative. In addition, the probability of a region (e.g., a range of points) may be determined by the integral of that region with respect to the base probability density 400. In a standard distribution centered at an origin of the low-dimensional density space, a region having a particular distance from the origin may be evaluated to determine the relative accumulated probability of the points in the distribution having that distance or less to the origin. For example, a point having a distance to the origin corresponding to a 20% accumulated probability reflects that the point is more likely than 80% of the points in the probability distribution; while a point having a distance corresponding to a 95% accumulated probability reflects that the point is less likely than that 95% of accumulated points, and more likely than only 5% of points in the distribution. In other known probability densities, the respective accumulated probability may be determined based on another metric, such as an accumulated probability relative to a mean, median, or mode of the base probability density 400.

As such, the density transformation 420 may be considered as changing the positions in the known probability density to positions of the low-dimensional manifold space 430, such that the probability information of the base probability density 400 may be represented as a low-dimensional manifold density 440. As one application, points may be sampled from the base probability density 400 and transformed to the low-dimensional manifold density 440 with the density transformation 420. Similarly, points in the low-dimensional manifold density 440 may be transformed to the base probability density 400 for calculation of the respective likelihood of the point in the base probability density 400. In some embodiments, the density transformation 420 is a bijective flow.

Generally, the density transformation and the manifold transformation are invertible, continuous, and differentiable, such that the base probability density 400 may be converted forward to the respective manifolds while providing the equivalent probabilistic volume in the translated coordinate spaces. That is, the differential probabilistic volume dz of a point z in low-dimensional density space $\mathcal{Z}$ should remain equivalent when converted to positions in low-dimensional manifold space 430 ($\mathcal{U}$) and high-dimensional space 460 ($\mathcal{X}$). Thus, the volume over equivalent regions across $\mathcal{Z}$, $\mathcal{U}$, and $\mathcal{X}$ conserve the same probabilistic value. Similarly, the transformations should be invertible such that the transformations can be learned based on the training data in the high-dimensional manifold 470.

In the discussion below, the various spaces and transformations may be referred to with reference numbers as shown in FIG. 4 or with respective symbols. Table 1 provides a correspondence table for the avoidance of ambiguity:

| Name | Ref No. | Symbol |
|---|---|---|
| High-dimensional space | 460 | $\mathcal{X}$ |
| High-dimensional manifold | 470 | $\mathcal{M}$ |
| Low-dimensional manifold space | 430 | $\mathcal{U}$ |
| Low-dimensional density space | 410 | $\mathcal{Z}$ |
| Base probability density | 400 | $p_z()$ |
| Low-dimensional manifold density | 440 | $P_u()$ |
| Density Transformation | 420 | $h: \mathcal{Z} \rightarrow \mathcal{U}$<br>$hr^{-1}: \mathcal{U} \rightarrow \mathcal{Z}$ |
| Manifold Transformation | 450 | $g: \mathcal{U} \rightarrow \mathcal{M} \in \mathcal{X}$<br>$g^{\dagger}: \mathcal{X} \rightarrow \mathcal{M}$ |

In general cases, the transformations of such spaces have been difficult to learn, and in many cases may be intractable and cannot be automatically solved in the general case by a trained model. In particular, the transformations are generally smooth and account for the volumetric change in density as the coordinates are transformed across spaces. This may be particularly challenging when converting from $\mathcal{U}$ to $\mathcal{X}$ as the number of dimensions increases from the low-dimensional manifold space 430 to the high-dimensional space 460. In the general case, the differential change in volume du when changing variables to the n-dimensional space $\mathcal{X}$ from the m-dimensional low-dimensional manifold space $\mathcal{U}$ may be expressed by an n×m Jacobian matrix $J_g$, describing the differential change in variables of the coordinates in $\mathcal{X}$ relative to differential change in variables of $\mathcal{U}$. To determine the change in probability density of $p_u(u)$ for a point u in $\mathcal{U}$ when converted to corresponding coordinates of $\mathcal{X}$ as point x as a probability density $P_x(x)$, the instantaneous change in density across coordinate spaces can be described by a change in volume of $\mathcal{X}$ relative to the change in volume in $\mathcal{U}$:

$$\frac{\partial X}{\partial U}(u) = \sqrt{\det\left[J_g^T(u) J_g(u)\right]} \quad \text{Equation 1}$$

Eq. 1 shows that the Jacobian $J_g$ (u) of the transform g, and its transpose $$J_g^T(u)$$

are multiplied to obtain a square matrix with respect to the coordinates of $\mathcal{X}$, for which the determinant can be determined as a scalar. As shown in Eq. 1, the square root of the determinant of the Jacobian transpose $$J_g^T$$

multiplied by the Jacobian $J_9$ may be used to determine the equivalent probability density when converting from $\mathcal{U}$ to $\mathcal{X}$ (more precisely, the instantaneous change in probability density volume at point u when converted from a volume in $\mathcal{U}$ to a volume in $\mathcal{X}$ at the corresponding point x). Generally, for the probability density of points u on the low-dimensional manifold density 440, the probability density for points x may thus be determined by converting points in $\mathcal{X}$ to $\mathcal{U}$, determining the probability density in $\mathcal{U}$ and converting the density volume to $\mathcal{X}$ per Equation 1:

$$p_x(x) = p_u(u)\left|\det\left[J_g^T(u) J_g(u)\right]\right|^{-\frac{1}{2}} \quad \text{Equation 2}$$

In Equation 2, as an abbreviation, "u" may represent the conversion of a point x in $\mathcal{X}$ to the low-dimensional manifold space 430 (i.e., $\mathcal{U}$) with the high-to-low density manifold transformation 450: $u=g^{\dagger}(x)$. For example, $p_u(g^{\dagger}(x))$ was substituted as $p_u(u)$ in Equation 2. As such, the probability density for $\mathcal{X}$ is defined in Eq. 2 after converting points in high-dimensional manifold space $\mathcal{X}$ to low-dimensional manifold space $\mathcal{U}$, determining the probability density in $\mathcal{U}$ and applying Eq. 1 to the density to determine the equivalent change in density volume after change-of-variables back to the high-dimensional space $\mathcal{X}$.

Similarly, and more simply, the probability density $p_u$ of points in $\mathcal{U}$ based on the probability density $p_z$ in $\mathcal{Z}$ may be simplified when the low-dimensional spaces have the same dimensionality, and can be given by:

$$P_u(u)=p_z(h^{-1}(u))|\det J_h(h^{-1}(u))|^{-1} \quad \text{Equation 3}$$

To combine the density transformation 420 and manifold transformation 450 in equations 2 and 3 for transforming the base probability density 400 in $\mathcal{Z}$ to $\mathcal{X}$ applies transformations g and h sequentially: g∘h. Applying the chain rule $J_{g \circ h}=J_g J_h$ provides a determinant det $$\left[J_h^T J_g^T J_g J_h\right] = (\det J_h)^2 \det\left[J_g^T J_g\right]$$

due to the square Jacobian of the outer h density transformation 420. As such, the probability density of the high-dimensional manifold 470 in the high-dimensional space $\mathcal{X}$ may be defined as:

$$p_x(x) = p_z(z)|\det J_h(z)|^{-1}\left|\det J_g^T(u) J_g(u)\right|^{-\frac{1}{2}} \quad \text{Equation 4}$$

In Equation 4, points "z" may represent points x transformed to Z: $z=h^{-1}(g^{\dagger}(x))$. In this formulation, however, to properly learn both the manifold itself and its density transformation, the transformations may be trained to maximize a log-likelihood of the transformations based on the training data. However, the log det $$\left[J_g^T J_g\right]$$

term is generally intractable in training and cannot be effectively learned, preventing effective automated machine learning for the general case.

To enable this term to be tractable (i.e., computable) and to permit layering of individual transformational layers (e.g., such that g includes layers $g_1, \ldots g_k$: $g=g_1\ g_k$), the manifold transform includes one or more conformal flows. A conformal flow is a transformation in which the Jacobian satisfies:

$$J_g^T(u)J_g(u)=\lambda^2(u)I_m \qquad \text{Equation 5}$$

As shown in Eq. 5, the Jacobian transpose multiplied by the Jacobian in a conformal flow are equal to a scalar $\lambda$ (a function of u) squared and an Identity matrix of m (the dimensionality of the origin space, here the low-dimensional manifold space $\mathcal{U}$). The relationship of Eq. 5 is also illustrated in the following matrix in which m=3 (i.e., $I_m=I_3$):

$$J_g^T J_g=\begin{pmatrix}\lambda^2(u) & 0 & 0\\ 0 & \lambda^2(u) & 0\\ 0 & 0 & \lambda^2(u)\end{pmatrix}$$

The scalar $\lambda$ is non-zero and may be referred to as the conformal factor. By selecting layers of the manifold transformation 450 as conformal flows, multiple such layers may be sequentially applied ($g_1$ then $g_2$ etc.) and the transformation becomes tractable for automated learning of the manifold transformation with the density transformation. With conformal flows, the probability density of $\mathcal{X}$ transformed from $\mathcal{U}$ (Equation 2) simplifies to a transformation based on the scalar as shown in Equation 6:

$$p_x(x)=p_u(u)\lambda^{-m}(u) \qquad \text{Equation 6}$$

Figure 5B:
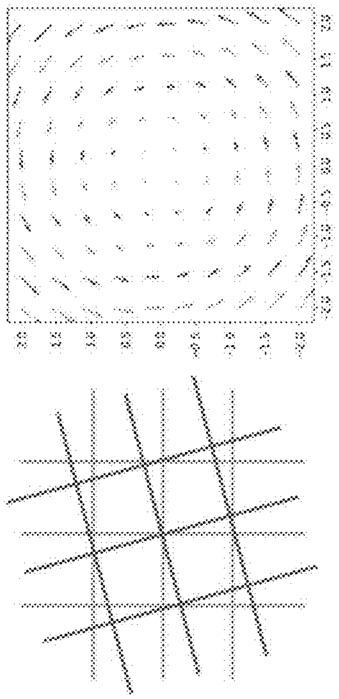
FIGS. 5A-E show example conformal flows in a two-dimensional space.
Figure 5D:
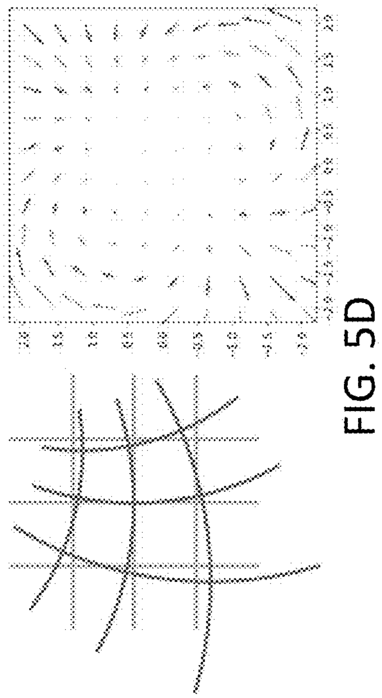
Figure 5E:
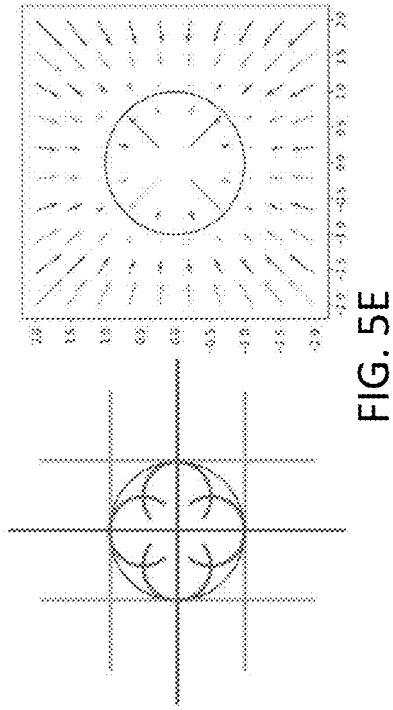
Figure 5A:
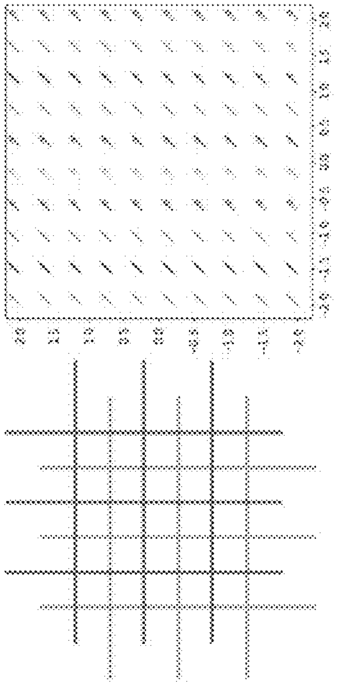
Figure 5C:
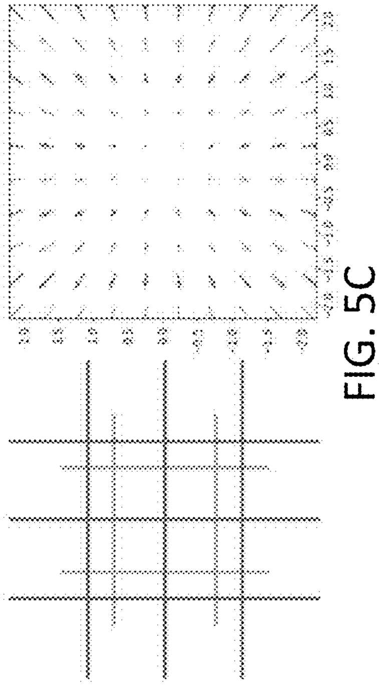

FIGS. 5A-E show example conformal flows in a two-dimensional space. As shown in these figures, the transformation of a space is shown along with a field showing the relative movement within a space. In FIG. 5A, a translation moves points a constant amount. FIG. 5B shows an orthogonal transformation, in which points are rotated about an axis (e.g., the origin). FIG. 5C shows scaling, in which points are scaled outward or inward from an origin. FIG. 5D shows a special conformal transformation ("SCT") in which an inversion is followed by a translation and then another inversion. FIG. 5E shows an inversion, in which points are inverted, e.g., about a unit circle. As shown by these example conformal flows, another property of conformal flows is that orthogonal intersections between lines remain orthogonal after transformation. Stated another way, conformal flows preserve local angles during transformation.

Using a transformation with conformal flows, the transformation of the probability density from $\mathcal{Z}$ to $\mathcal{X}$ from Equation 4 simplifies to:

$$p_x(x)=p_z(z)|\det J_h(z)|^{-1}\lambda^{-m}(u) \qquad \text{Equation 7}$$

As shown in Equation 7, the density and manifold inverse transforms are applied to convert points in $\mathcal{X}$ to $\mathcal{Z}$ as before, the Jacobian of the density transform $J_h$ remains, while the Jacobian of the manifold transform is simplified to the scalar $\lambda^{-m}(u)$ term as a function of u and the dimensionality m. As discussed below, this also permits a mixed loss function that permits joint training of the density transformation and manifold transformation because the probability density conversion between $\mathcal{Z}$ and $\mathcal{X}$ is tractable. It is possible when sequentially training the transformations (e.g., the manifold transformation followed by the density transformation) for the manifold transformation to learn a configuration that is not effectively learned by the density transformation relative to other possible manifold transformations. Because the transforms $\mathcal{Z}$ to $\mathcal{X}$ are tractable, the two may be jointly learned and thus increase the likelihood that the manifold transform learns a configuration effective for representing the density.

Conformal Layers

The manifold transform may include a number of layers (e.g., of individual transform operations) that together transform and change the dimensionality from the high-dimensional space to the low-dimensional space. In one embodiment, the manifold transform includes one or more of the transformations shown in FIGS. 5A-E, namely translation, orthogonal transformation, inversion, scaling, and SCT (special conformal transform). The manifold transform may include various layers performing individual transformational operations. The layers may include operations that change the dimensionality of the input and output (e.g., the transformational matrix is non-square) and layers which maintain the dimensionality through the operation (e.g., the transformational matrix is square). The layers are parametrizable conformal flows such that the layers maintain the simplification shown by Equations 6 and 7 and the respective parameters may be learned during training. As layered conformal flows maintain the conformality, many such layers may be stacked to modify dimensionality between the low-dimensional space to the high-dimensional space while learning the parameters describing the manifold in $\mathcal{X}$ and maintaining the conformal properties through the layers of the manifold transformation 450 (e.g., the complete sequence of layers in g and its inverse).

The layers that preserve dimensionality may include the transformations shown in FIGS. 5A-5E, namely, translation, orthogonal transformation, inversion, scaling, and SCT. These layers provide transforms for transforming an input space u to an output space v, and are parametrizable with respective scalar values as shown in Table 1:

TABLE 1

| Conformal Mappings | | | | |
|---|---|---|---|---|
| TYPE | FUNCTIONAL FORM | PARAMS | INVERSE | $\lambda(u)$ |
| Translation | $u \mapsto u + a$ | $a \in \mathbb{R}^d$ | $v \mapsto v - a$ | 1 |
| Orthogonal | $u \mapsto Qu$ | $Q \in O(d)$ | $v \mapsto Q^T v$ | 1 |
| Scaling | $u \mapsto \lambda u$ | $\lambda \in \mathbb{R}$ | $v \mapsto \lambda^{-1} v$ | $\lambda$ |
| Inversion | $u \mapsto u/\lVert u\rVert^2$ | | $v \mapsto v/\lVert v\rVert^2$ | $\lVert u\rVert^{-2}$ |

TABLE 1-continued

| Conformal Mappings | | | | |
|---|---|---|---|---|
| TYPE | FUNCTIONAL FORM | PARAMS | INVERSE | λ(u) |
| SCT | $u \mapsto \frac{u + a[[u]]^2 b}{1 - 2b \cdot u + [[b]]^2[[u]]^2}$ | $b \in \mathbb{R}^d$ | $v \mapsto \frac{v + a[[v]]^2 b}{1 + 2b \cdot v + [[b]]^2[[v]]^2}$ | $1 - 2b \cdot u + \|b\|^2 \|u\|^2$ |

Each of these conformal mapping is briefly discussed in turn.

The translation may learn a parameter a describing the relative movement of points in the input as a shift relative to the origin, which may be inverted by subtracting the value of a values.

The orthogonal transformation uses matrix Q to rotate about an origin. The matrix Q as a parameter for the orthogonal transformation is selected from the orthonormal matrices O(d) (of the respective layer dimensionality d) that preserve local angles and where Q multiplied by its transpose yields the identity ($QQ^T = I_d$). The orthogonal matrix Q may be parameterized for training, including the use of a Householder matrix and by parameterizing the special orthogonal group with a matrix exponential of skew-symmetric matrices. Equation 8 shows a definition of a Householder Matrix in which v may be learned for constructing Q:

$$Q = I - 2\frac{vv^T}{\|v\|^2} (v \in \mathbb{R}^m) \quad \text{Equation 8}$$

In the skew-symmetric parameterization, Q may be parameterized with Equation 9:

$$Q = \exp(A)(A^T = -A) \quad \text{Equation 9}$$

The scaling transform increases or decreases the distance of point from the origin based on the scaling amount.

The inversion inverts the values of points about a distance from the origin, typically but not always the unit distance. In one embodiment, the inversion may be numerically instable, such that the SCT may be used as an alternative. As discussed above, the SCT (special conformal transform) includes, sequentially, an inversion followed by a translation followed by an inversion.

As such, to learn a conformal mapping at a particular dimensionality (without changing the dimensionality), the translation, orthogonal transform, scaling, and inversion layers may be stacked.

Various transforms may also be used to modify the dimensionality of the input and output for a layer. For example, the example transforms above may also be modified to versions which modify dimensionality while maintaining conformal properties. As additional examples, a layer may include non-square matrices with orthonormal columns (which are conformal) to modify the dimensionality of a layer. As another example, a layer may include zero-padding to modify the dimensionality of a layer by adding zeros in additional dimensions. By following the zero-padding layer with additional transformations, the additional dimensions in a relatively higher-dimensional space may be populated based on information from the lower-dimensional layers.

As an additional example, a layer may include convolutions within the transformation. As one embodiment of a conformal convolutional (which is also invertible), the convolutional layer may include a k×k convolution with a stride of k, such that the convolutional layer has a block diagonal Jacobian. The layer may thus implement a set of convolutional filters that together form an orthogonal matrix to provide a conformal layer. Similarly, the blocks may be inverted with a transposed convolution of the same filter.

In addition, to account for additional types of manifold transform layers, the conformality in some embodiments may be relaxed and allow layers which are not completely smooth. As one example, a manifold transformation layer may be required to be conformal with respect to regions of $\mathcal{U}$ to which the density transformation may transform points from $\mathcal{Z}$. I.e., conformal at h(z), such that g(u) remains conformal from the positions of $\mathcal{U}$ corresponding to h(z). As another example, the conformal layers may include piecewise conformal layers, such as a piecewise activation (ReLU) layer or a conditional Orthogonal layer. Examples of these piecewise layers are shown in Table 2:

TABLE 2

| Piecewise Conformal Embeddings | | | | |
|---|---|---|---|---|
| TYPE | FUNCTIONAL FORM | PARAMS | LEFT INVERSE | λ(u) |
| Conformal ReLu | $u \mapsto ReLU\begin{bmatrix} Qu \\ -Qu \end{bmatrix}$ | $Q \in O(d)$ | $\begin{bmatrix} v_1 \\ v_2 \end{bmatrix} \mapsto Q^T(v_1 - v_2)$ | 1 |
| Conditional Orthogonal | $u \mapsto \begin{cases} Q_1 u & \text{if } \|u\| < 1 \\ Q_2 u & \text{if } \|u\| \geq 1 \end{cases}$ | $Q_1, Q_2 \in O(d)$ | $v \mapsto \begin{cases} Q_1^T u & \text{if } \|v\| < 1 \\ Q_2^T u & \text{if } \|v\| \geq 1 \end{cases}$ | 1 |

As shown by the foregoing discussion, many types of conformal flows (e.g., individual layers) may be included while providing the simplified and overall tractable transformation for the manifold transformation that was not previously effective to analyze. While conformal layers provide some constraint on the types of transform that may be considered in modeling the manifold in the high-dimensional space, the various types of transforms permit complex transformations of the space while reducing the dimensionality. The model structure may include a large number of different layers for which parameters are learned and may be constructed according to the particular type of data.

Training

The parameters of the model may be learned to optimize the manifold transform, which characterizes the manifold of the high-dimensional space, and the density transform, which characterizes the probability density on the manifold. Thus, generally, the transforms must achieve two objectives: align the learned manifold with the training data and evaluate densities for off-manifold points.

Figure 6:
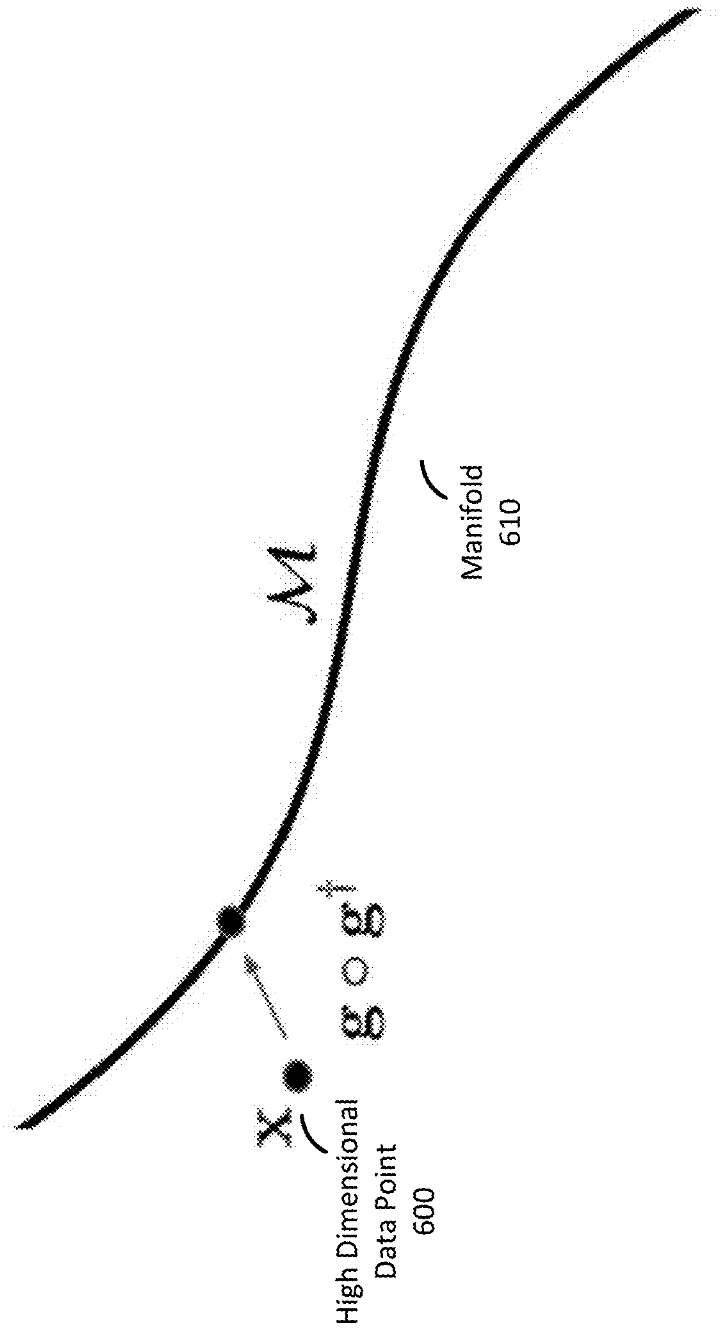
FIG. 6 shows an example of a manifold and an off-manifold data point.

FIG. 6 shows an example of a manifold 610 and an off-manifold data point 600. As shown, the data point x 600 is not accurately captured by the manifold. As one way of describing the error in the manifold transformation, the high-dimensional training data may be converted to the low-dimensional space with the inverse transform and then re-converted to the high-dimensional space with g ($g^{\dagger}(x)$). As a result, the point converted back to high-dimensional space will be located on the respective manifold according to the values of the transform, allowing a reconstruction loss to be described by the difference between the original position of x and its position when the manifold transforms and its inverse are applied. In one embodiment, the manifold transformation may be learned based on minimizing such a reconstruction error given the high-dimensional points in the training set. The density manifold may then be sequentially learned to describe the probability density with respect to the low-dimensional manifold based on the manifold transform applied to the training data.

However, when using conformal flows, because the manifold transform is tractable, it may be jointly learned in conjunction with the density transform. As one example training loss, the loss may be defined as:

$$\mathcal{L}=\mathbb{E}_{x\sim p_{x}^{*}}[-\log p_{x}(x)+\alpha\|x-g(g^{\dagger}(x))\|^{2}] \qquad \text{Equation 10}$$

As shown in Equation 10, the loss may minimize the log-likelihood directly for the manifold transformation, a result which is now possible because the manifold transformation is actually computable, allowing the parameters for both the density transform and manifold transform to be jointly learned. In some embodiments, the manifold transform may be initialized with reconstruction loss before applying the joint loss such that the low-dimensional manifold has a more effective starting value for the joint learning. As another example training approach, the transforms may be trained a loss function to minimize the Wasserstein distance between the training data distribution and the learned probability density.

Model Application

After training the model, the model may then be used for inference or sampling by the inference module 150 and sampling module 130, respectively. To perform inference, a new data point may be converted through the transforms to the low-dimensional density space $\mathcal{Z}$ and compared with the probability density (e.g., the accumulated probability) to determine the respective likelihood of the point relative to the training data. This may be used, for example, to describe the relative portion of points that are more or less likely than the new point, or to determine whether the point may be considered to be in or out of distribution based on its likelihood. To perform sampling from the model, a point may be sampled from the base probability density and passed through the transforms to a point in the high-dimensional space, which may be output as a sample of the model.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for probabilistic manifold modeling, comprising:

a processor; and a computer-readable medium having instructions executable by the processor for:

identifying a high-dimensional output space for an output domain of a generative computer model, wherein data in the output domain lies on a manifold in the high-dimensional output space;
identifying a low-dimensional space with a base probability distribution;
generating a generated output in the output domain with the generative computer model by:
sampling from the base probability distribution to obtain a first position in the low-dimensional space;
applying a first set of computer model layers of the generative computer model having first parameters defining a density transformation of the first position to obtain a second position in the low-dimensional space; and
applying a second set of computer model layers of the generative computer model having second parameters defining a manifold transformation of the second position to obtain the generated output in the high-dimensional space, the manifold transformation comprising one or more conformal flows between the high-dimensional output space and the low-dimensional space and describing the manifold of the high-dimensional output space in the low-dimensional space.

2. The system of claim 1, wherein the manifold transformation consists of one or more conformal flows.

3. The system of claim 1, wherein the high-dimensional space is an image space having dimensions describing a plurality of pixels at a resolution.

4. The system of claim 1, wherein the instructions are further executable for training the first parameters and second parameters based on a training set of data points in the high-dimensional space.

5. The system of claim 4, wherein the first parameters and second parameters are jointly trained.

6. The system of claim 1, wherein the conformal layers are conformal with respect to regions of the low-dimensional space to which the density transformation may transform points from the base probability density.

7. The system of claim 1, wherein the conformal layers include piecewise conformal layers.

8. A computer-implemented method for probabilistic manifold modeling, comprising:
identifying a high-dimensional output space for an output domain of a generative computer model, wherein data in the output domain lies on a manifold in the high-dimensional output space;
identifying a low-dimensional space with a base probability distribution;
generating a generated output in the output domain with the generative computer model by:
sampling from the base probability distribution to obtain a first position in the low-dimensional space;
applying a first set of computer model layers of the generative computer model having first parameters defining a density transformation of the first position to obtain a second position in the low-dimensional space; and
applying a second first set of computer model layers of the generative computer model having second parameters defining a manifold transformation of the second position to obtain the generated output in the high-dimensional space, the manifold transformation comprising one or more conformal flows between the high-dimensional output space and the low-dimensional space and describing the manifold of the high-dimensional output space in the low-dimensional space.

9. The computer-implemented method of claim 8, wherein the manifold transformation consists of one or more conformal flows.

10. The computer-implemented method of claim 8, wherein the high-dimensional space is an image space having dimensions describing a plurality of pixels at a resolution.

11. The computer-implemented method of claim 8, further comprising training the first parameters and second parameters based on a training set of data points in the high-dimensional space.

12. The computer-implemented method of claim 11, wherein the first parameters and second parameters are jointly trained.

13. The computer-implemented method of claim 8, wherein the conformal layers are conformal with respect to regions of the low-dimensional space to which the density transformation may transform points from the base probability density.

14. The computer-implemented method of claim 8, wherein the conformal layers include piecewise conformal layers.

15. A non-transitory computer-readable medium for probabilistic manifold modeling, the non-transitory computer-readable medium comprising instructions executable by a processor for:
identifying a high-dimensional output space for an output domain of a generative computer model, wherein data in the output domain lies on a manifold in the high-dimensional output space;
identifying a low-dimensional space with a base probability distribution;
generating a generated output in the output domain with the generative computer model by:
sampling from the base probability distribution to obtain a first position in the low-dimensional space;
applying a first set of computer model layers of the generative computer model having first parameters defining a density transformation of the first position to obtain a second position in the low-dimensional space; and
applying a second set of computer model layers of the generative computer model having second parameters defining a manifold transformation of the second position to obtain the generated output in the high-dimensional space, the manifold transformation comprising one or more conformal flows between the high-dimensional output space and the low-dimensional space and describing the manifold of the high-dimensional output space in the low-dimensional space.

16. The non-transitory computer-readable medium of claim 15, wherein the manifold transformation consists of one or more conformal flows.

17. The non-transitory computer-readable medium of claim 15, wherein the high-dimensional space is an image space having dimensions describing a plurality of pixels at a resolution.

18. The non-transitory computer-readable medium of claim 15, wherein the instructions are further executable for training the first parameters and second parameters based on a training set of data points in the high-dimensional space.

19. The non-transitory computer-readable medium of claim 15, wherein the conformal layers are conformal with respect to regions of the low-dimensional space to which the density transformation may transform points from the base probability density.

20. The non-transitory computer-readable medium of claim 15, wherein the conformal layers include piecewise conformal layers.

* * * * *